United States Patent [19]
Wycech

[11] Patent Number: 4,853,270
[45] Date of Patent: Aug. 1, 1989

[54] KNEE BLOCKER FOR AUTOMOTIVE APPLICATION

[75] Inventor: Joseph S. Wycech, Grosse Pointe Woods, Mich.

[73] Assignee: Essex Specialty Products, Inc., Clifton, N.J.

[21] Appl. No.: 211,751

[22] Filed: Jun. 27, 1988

[51] Int. Cl.$^4$ .......................... B32B 1/00; B32B 3/00
[52] U.S. Cl. ...................................... 428/68; 264/313;
280/748; 280/751; 280/752; 428/76; 428/313.3;
428/313.9; 428/323; 428/325; 428/327;
428/403; 428/407
[58] Field of Search ............... 264/313, 314, 315, 316;
280/748, 751, 752; 428/68, 71, 76, 313.3, 313.9,
323, 325, 327, 403, 407

[56] References Cited
U.S. PATENT DOCUMENTS

| | | | |
|---|---|---|---|
| 2,021,837 | 11/1935 | Davidson | 264/142 |
| 2,531,739 | 11/1950 | Orsini | 264/141 |
| 2,622,273 | 12/1952 | Detwiler | 264/141 |
| 2,770,841 | 11/1956 | Cooke et al. | 264/209.4 |
| 2,784,006 | 3/1957 | Dye et al. | 280/750 |
| 2,870,486 | 1/1959 | Wagner et al. | 264/209.6 |
| 2,951,261 | 9/1960 | Sherman | 425/425 |
| 2,975,483 | 3/1961 | Cooper et al. | 264/143 |
| 3,046,606 | 7/1962 | Carter | 264/141 |
| 3,092,878 | 6/1963 | Conger | 264/120 |
| 3,203,709 | 8/1965 | Presunka et al. | 280/750 |
| 3,224,924 | 12/1965 | Von Ardenne et al. | 428/117 |
| 3,230,184 | 1/1966 | Alford | 523/219 |
| 3,253,967 | 5/1966 | Blakely, Jr. et al. | 264/DIG. 6 |
| 3,304,355 | 2/1967 | Pobst, Jr. et al. | 264/117 |
| 3,324,510 | 6/1967 | Kleeb | 425/310 |
| 3,509,247 | 4/1970 | Perrone et al. | 264/143 |
| 3,519,706 | 7/1970 | Pantsios | 264/143 |

(List continued on next page.)

FOREIGN PATENT DOCUMENTS 2916687 11/1980 Fed. Rep. of Germany ...... 280/751

*Primary Examiner*—William J. Van Balen
*Attorney, Agent, or Firm*—Curtis, Morris & Safford

[57] ABSTRACT

This invention relates to a passive restraint for an automobile, and moe particularly, to a knee blocker for automotive applications that is positioned under the steering column forward of the knees. In order to provide energy absorption, the knee blocker includes an energy absorbing core filled with a plurality of thermoset resin pellets. The energy absorbing core is disposed between a metal stamping and a vinyl foam skin padding. Each of the pellets consist essentially of substantially uncured thermoset polymeric resins and microspheres which have been intermixed and extruded. Each of the pellets also has a coating of a B-staged resin. These thermoset pellets are made in the following manner. A low viscosity thermoset resin and microspheres are mixed together without melting the thermoset resin and extruding the mixture to form a continuous strand of paste-like uncured material. The continuous strand is expanded and gelled on a conveyor which preferably includes radiant heater or other means for accelerating the gelling of the continuous strands into solid form. The strands are then cut or chopped into pellet form and may be coated with an adhesive or B-staged material in preparation for forming into structural reinforcements. The pellets are filled with microspheres in the amount of 20 to 35% of resin weight. The pellets may include unexpanded thermally expandable microspheres which permit expansion of the pellets when exposed to heat to provide a pellet having a bulk density as low as 9 pounds per cubic foot. The pellets may be formed of a thermoset resin such as a polyester resin or epoxy resin, vinylester resin, polyurethane resin, or phenolin resin and may include organic, inorganic or glass preexpanded microspheres. Alternatively, the pellets may include unexpanded thermally expandable thermoplastic microspheres or a liquid blowing agent if expansion of the pellets is desired. A cure aid or curing agent may be included in the pellet mix to facilitate curing of the pellet in the final reinforcement and other additives may be incorporated in the pellet mix to improve extrudability or other properties of the pellets.

7 Claims, 4 Drawing Sheets

U.S. PATENT DOCUMENTS

| | | | |
|---|---|---|---|
| 3,562,373 | 2/1971 | Logrippo | 264/118 |
| 3,600,486 | 8/1971 | Walker et al. | 264/9 |
| 3,652,486 | 3/1972 | Young | 523/219 |
| 3,670,467 | 6/1972 | Walker | 51/298 |
| 3,676,534 | 7/1972 | Anderson | 264/9 |
| 3,784,224 | 1/1974 | Peeler | 297/471 |
| 3,834,482 | 9/1974 | Wada et al. | 180/90 |
| 3,892,708 | 7/1975 | Cronenberger et al. | 523/219 |
| 3,900,543 | 8/1975 | Davis | 264/DIG. 6 |
| 3,917,547 | 11/1975 | Massey | 428/313.9 |
| 3,930,665 | 1/1976 | Ikawa | 280/751 |
| 3,931,988 | 1/1976 | Oehm et al. | 280/807 |
| 3,989,275 | 11/1976 | Finch et al. | 280/751 |
| 4,032,175 | 6/1977 | Aibe et al. | 280/751 |
| 4,038,238 | 7/1977 | Cravens | 523/219 |
| 4,098,525 | 7/1978 | Schwanz et al. | 280/750 |
| 4,104,098 | 8/1978 | Hush et al. | 156/149 |
| 4,122,145 | 10/1978 | Hartmann | 264/174 |
| 4,126,661 | 11/1978 | Fulconis et al. | 264/209 |
| 4,170,619 | 11/1979 | Fridrich | 264/113 |
| 4,240,779 | 12/1980 | Turk | 425/313 |
| 4,247,502 | 1/1981 | Loechell | 264/143 |
| 4,248,584 | 2/1981 | Fridrich | 425/553 |
| 4,273,806 | 6/1981 | Stechler | 264/DIG. 6 |
| 4,291,899 | 9/1981 | Muramoto | 280/806 |
| 4,317,582 | 3/1982 | Cottin et al. | 280/751 |
| 4,363,690 | 12/1982 | Gagliani et al. | 264/DIG. 6 |
| 4,368,901 | 1/1983 | Kojima | 280/748 |
| 4,400,011 | 8/1983 | Matsuno | 280/748 |
| 4,405,543 | 9/1983 | Murphy et al. | 264/DIG. 6 |
| 4,413,838 | 11/1983 | Varterasian et al. | 280/751 |
| 4,427,215 | 1/1984 | Weichenrieder et al. | 280/752 |
| 4,433,068 | 2/1984 | Long et al. | 264/DIG. 6 |
| 4,447,565 | 5/1984 | Lula et al. | 264/DIG. 6 |
| 4,459,254 | 7/1984 | Zuber | 264/143 |
| 4,468,051 | 8/1984 | Kobayashi | 280/751 |
| 4,575,117 | 3/1986 | Uchida | 280/750 |
| 4,581,191 | 4/1986 | Hartmann | 264/143 |
| 4,660,852 | 4/1987 | Katayama et al. | 280/750 |
| 4,721,329 | 1/1988 | Brantman et al. | 280/751 |
| 4,737,407 | 4/1988 | Wycech | 428/313.5 |

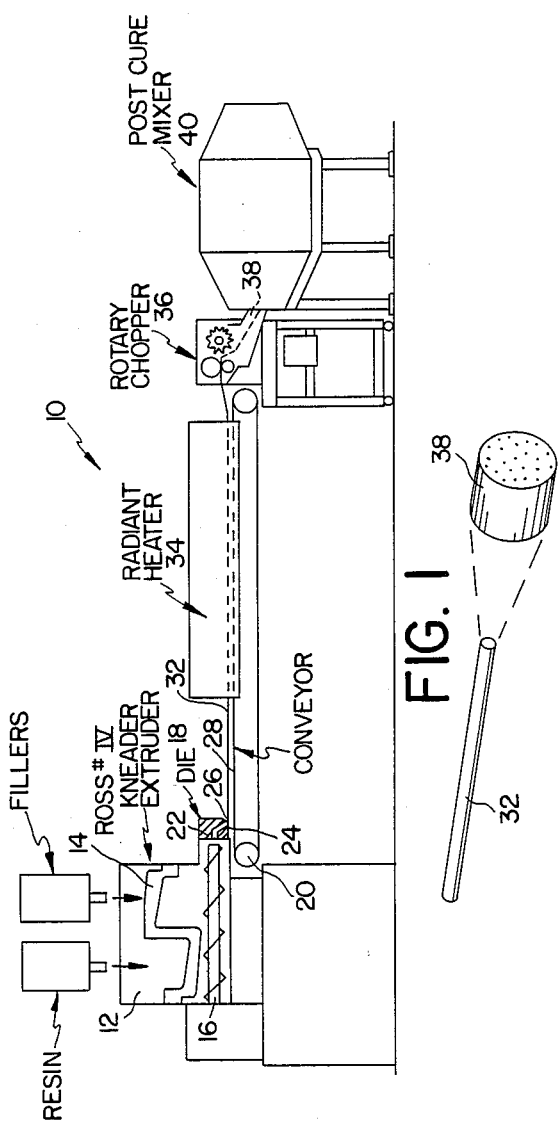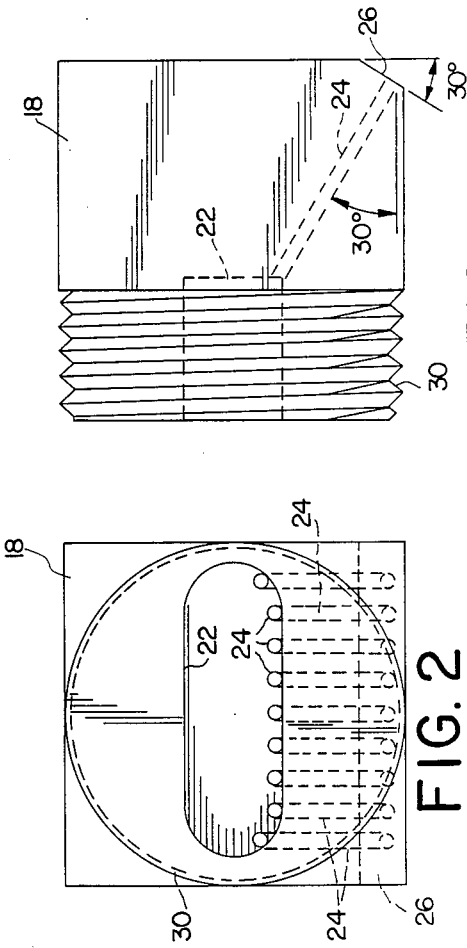

KNEE BLOCKER FOR AUTOMOTIVE APPLICATION

BACKGROUND OF THE INVENTION

The present invention relates to a passive restraint for an automobile, and more particularly, to a knee blocker for automotive applications that is positioned under the steering column forward of the knees.

Recently, the National Highway Traffic Safety Administration promulgated standard No. 208 entitled Occupant Crash Protection which is applicable to all automobiles manufactured by 1990 and requires that the impinging load upon the knee and into the femur or thigh area during an automobile crash should not be more than 2250 pounds per leg. If the driver does not wear a lap belt, the forward motion of the driver into the instrument panel creates a femur load in both legs vastly greater than 2200 lbs. As a result thereof, the automobile industry has actively been pursuing various designs for passive restraints which absorb the impact when the knees are forced into the instrument panel to create an impinging load on the femur or thigh area during an automobile crash of less than 2250 pounds per leg. Such a design is the subject of U.S. Pat. No. 4,721,329 to Brantman et al. issued Jan. 26, 1988.

Typically, these passive restraints include a suitable energy-absorption material that is enveloped in a cavity of the passive restraint. In the Brantman reference, an elastic polyethylene foam layer having a density of about 6 lbs/ft$^3$, and about 1½ inches thick absorbs energy upon impact of the knees. In addition, in Brantman, to provide further energy absorption an outer layer is formed of crushable polystyrene foam about 1½ inches thick, and having a density 2 lbs/ft$^3$. It has been found extremely expensive, however, during the manufacturing process to produce a passive restraint having a layer of crushable pellets and a layer of polyethylene foam material as is disclosed in Brantman.

In order to alleviate this cost, the present invention includes a passive restraint defining a frame having an internal cavity including microsphere-filled thermoset resin pellets which are extruded in paste form, gelled and pelletized. These thermoset resin pellets are the subject of U.S. Pat. No. 4,737,407 issued Apr. 12, 1988 to Joseph Wycech, the subject matter of which is incorporated by reference. In contrast to the Brantman reference, the necessity of a polyethylene foam material being intermixed with crushable pellets in an internal cavity of the passive restraint is alleviated by this invention.

As further background, plastic materials are currently used for filling and reinforcing structural members. Expanded polyurethane foam is known to be used for filling structural members to improve sound damping, thermal insulating and crush strength qualities of the structures. Plastic fillings are used in boats to fill floatation cavities and in vehicles to act as sound baffles and reinforcements for hollow structural members.

The most common type of plastic used in such applications is expanded polyurethane foam. In structural reinforcement applications, expanded polyurethane foam lacks compressive and tensile strength and has extremely low heat resistance.

In recent years, specialized plastic reinforcements have been developed wherein macrospheres are formed of glass microspheres which are combined with a phenolic binder. The macrospheres are then coated with a phenolic resin which increases the strength and shell thickness of the macrospheres but also adds weight to the final product. After coating with a phenolic resin, the macrospheres are coated with a B-staged phenolic or epoxy which permits the macrospheres to be bound together to form a structural reinforcement. Examples of two types of such macrospheres are two materials manufactured by 3M Company and identified by the following trade designations: M27X for uncoated macrospheres and M35EX for phenolic-coated macrospheres. The above macrospheres are known to be used as structural reinforcements for vehicles.

Another approach to improving the performance of plastic fillers to function as reinforcements is to provide styrofoam beads which are coated with an epoxy. One such product is sold by W. D. Grace Company under the tradename Ecosphere. The styrofoam bead has an epoxy coating which is in the form of a cured shell. The styrofoam bead with cured shell may be coated with an adhesive and used as a constituent element for structural fillers. However, the coated styrofoam beads are expensive and have only slightly greater compressive strength than polyurethane fillers and have only limited heat resistance due to the fact that the styrofoam substrate may begin to melt at temperatures as low as 210° F.

In terms of processing techniques, it is known to extrude thermoset materials by first B-staging the thermoset materials by heating them prior to extrusion. The B-staged thermoset materials emulate thermoplastic materials and are extrudable to a limited extent. However, the high viscosity of B-staged thermoset materials prevents incorporation of a high percentage of microsphere fillers since the heat and friction developed during the mechanical mixing of the B-staged resin causes the microspheres to be crushed and would limit the weight savings sought to be realized by the incorporation of lightweight microsphere fillers.

Prior art plastic reinforcements fail to provide a lightweight yet strong reinforcement which is thermally stable and competitive in cost to other types of structural reinforcements. These and other problems and disadvantages are overcome by the present invention as summarized below.

Referring now to FIG. 7, the method of making filled thermoset plastic pellets incorporated in the present invention is illustrated in a block diagram. The first step is shown to comprise mixing thermoset resin and microspheres. The mixture is cold extruded, preferably through a plurality of extrusion ports, to form at least one continuous strand which is deposited on an endless belt conveyor. The conveyor preferably moves at a speed substantially equal to the rate that the strand is extruded. The strand is a paste form mixture when extruded which is gelled on the conveyor to form a solid strand without B-staging the material. The strand is then chopped or otherwise formed into pellets. The pellets may be formed into structural reinforcements and cured in place in the structural members as described in Applicant's copending application Ser. No. 811,041, filed Dec. 19, 1985, the disclosure of which is hereby incorporated by reference.

The pellets are preferably coated with an adhesive prior to forming the pellets into structural reinforcements. The thermoset resin in the pellets is preferably a low viscosity epoxy or polyester resin and the microspheres may include expanded or unexpanded microspheres of organic materials or glass. Maximum strength and weight savings can be achieved by combining the resin with microspheres in the range of ratios of 1:2.75 to 3.5 parts by volume.

The mixing steps are performed at ambient temperatures or more preferably at a slightly elevated temperature below the B-staged temperature of the mixture. The mixture is preferably not B-staged in the mixer but is instead heated on the conveyor to a point above B-stage for a time period insufficient to B-stage wherein the strands gel within a very short period of time as they are conveyed to the pelletizer.

The pellets are intended to be used in according to the present invention in a passive restraint for automobile applications.

The pellets comprise uncured thermoset plastic resin which is intermixed with expanded microspheres and converted to its gelled, uncured, solid form. The pellets also preferably include thermally expandable microspheres which permit further reduction of the bulk density of the pellets. Alternatively, the pellet mixture may include a blowing agent which permits expansion of the pellets upon heating.

The pellets are preferably formed of a low viscosity thermoset resin such as a polyester resin or thermally cured epoxy resin. The pellets formed according to the process of the present invention are unique in that they are made by an extrusion process which provides significant processing efficiencies and yet are uncured solid members permitting the passive restraint systems formed with the pellets to be cured during later processing steps. Since the pellets are formed of thermoset resins, they are significantly stronger in terms of tensile and compressive strength as compared to thermoplastic pellets.

The pellets are generally composed of the following constituents in the following approximate ranges:

TABLE I

| Constituent | Range |
| --- | --- |
| Thermoset Resin | 100% resin weight |
| Organic or Inorganic Pre-Expanded Microspheres | 15–35% resin weight |
| Unexpanded Microspheres | 0–10% resin weight |
| Curing Agent | 0–3% resin weight |
| Wetting Agent | 0–15% resin weight |

The cure agent amount stated above would be appropriate for polyester or vinylester systems. If a one-part epoxy resin is used, the cure agent is advantageously in the range of 1 to 10% resin weight, and if a two-part epoxy resin is used, the cure agent is advantageously in the range of 0 to 50% resin weight. As is well known in the industry, the quantity of curing agent depends upon resin and cure system.

The apparatus for making the thermoset pellets of the present invention includes a batch mixer and extruder, or kneader-extruder, wherein the thermoset plastic resin, microspheres and other constituents are combined and from which the mixture is extruded. The mixture is extruded on an endless belt conveyor in paste form as a continuous strand. The endless belt conveyor is substantially synchronously operated with the rate of extrusion since the strand has only limited compressive and tensile strength at the time it is extruded. If the endless belt conveyor were to run too quickly, the strand would be stretched or broken and if ran too slowly, the strand would accumulate on the conveyor. It is preferred to provide an extrusion die having a plurality of linear bores which are oriented at an acute angle, preferably less than 30°, relative to the top surface of the conveyor belt. The strength of the strand is increased as the mixture gels. Gelling can be accelerated by exposing the strand to a catalyzing environment, preferably under an infrared heater as it passes along the conveyor. The strands are heated to above their B-stage temperature on the conveyor for a time period less than that required to B-stage the mixture. After gelling, the strands are tack-free, hardened, ductile but substantially uncured. The strands are then conveyed to an unloading station wherein the strands are broken or cut into pellets.

The pellets are coated with an adhesive by a tumbling process. The adhesive is comprised of a thermoset resin having two percent or less tensile elongation. The resin coating is provided primarily to provide adhesion between pellets and to the frame of the passive restraint system. If the coating has low tensile elongation characteristics, the ultimate compression strength of the pellets and passive restraint made with the pellets will be enhanced. Also, the resin coating can improve moisture resistance of the pellets and passive restrains made thereby and assures good long-term strength.

The primary advantage of the method and apparatus used in the present invention is that a simple and continuous process may be used to form highly filled, high strength thermoset pellets which are then usable as a constituent in the manufacture of pre-cast passive restraint systems. In addition, the product made according to the process is superior to thermoplastic pellets in terms of strength and temperature resistance. The pellets made according to the process are also superior to prior art B-staged thermoset pellets because they can be highly filled with unexpanded and expanded microspheres.

The primary advantage of the pellets is their high strength, ultra-low weight and low cost. Also, the thermoset materials have a higher temperature resistance as compared to prior art thermoplastic pellets. Bulk density of the pellets formed according to the present invention may be as low as 12 pounds per cubic foot when no unexpanded microspheres are used and may be as low as approximately 9 pounds per cubic foot if thermally expanded microspheres are included in the pellet mixture. The pellets are solid, that is, they do not contain voids or openings for the purpose of reducing bulk density.

As is well known, thermoset materials generally have greater compressive and tensile strength than thermoplastic materials. When combining this strength advantage with the above density levels, it will be readily appreciated that an extremely high strength and lightweight material is provided. Such a high strength, low density material is ideal for use in automotive applications where weight savings are important.

These pellets are utilized in a knee blocker that is positioned in the area of the instrument panel of an automobile that is under the steering column forward of the knees. The construction of this knee blocker basically consists of a one piece metal stamping which is approximately 12 inches high and runs the full width of the car from hinge pillar to hinge pillar and has a local pocket around the steering column in front of the driver to receive the knee blocker. The other side of the lower instrument panel consists of ¼ inch thick urethane foam with a vinyl skin attached thereto. The knee blocker is actually sandwiched between the metal stamping and the foam vinyl skin. This pre-cast element is made by vacuum foaming a female pocket and inserting the cast pre-coated pellets into the female pocket. These pellets will act as a crushable medium in that when the knee impacts the lower instrument panel, energy is absorbed by the pulverization and crush of the media.

Furthermore, this pre-cast element can be attached to the metal panel for initial product assurance by means of a variety of methods. First, the pre-cast part can be locked or trapped into the sheet metal at the top by a notch in the sheet metal. It can also be bonded to the metal stamping by means of a butyl tape or adhesive. By a third means of attachment, the vacuum form sheet can be stapled to the metal stamping.

Another advantage of the method of the present invention is that the pellets can conceivably be made from any type of thermoset material.

Other objects, advantages and efficiencies of the present invention will become apparent upon reviewing the attached drawings in view of the following specification and appended claims.

BRIEF DESCRIPTION OF DRAWINGS:

FIG. 1 is a side elevational schematic view of an illustrated embodiment of an apparatus for making the pellets used in the present invention.

FIG. 1a is a perspective view of the continuous strand and magnified perspective view of a pellet made in the apparatus of FIG. 1.

FIG. 2 is an end elevational view of a kneader-extruder die of the present invention.

FIG. 3 is a side elevational view of a kneader-extruder die of the present invention.

Referring now to FIG. 1, the apparatus 10 used in manufacturing the pellets incorporated in the present invention is schematically shown. The process of forming the pellets is schematically shown in FIG. 7 and begins by combining thermoset resin, fillers and other constituents in a kneader-extruder 12. The kneader-extruder 12 preferably includes a S-shaped mixer element 14 which combines the pellet constituents at room temperature without heating the mixture, provided that the resin viscosity is less than about 700 centipoises (cps). The kneader-extruder 12 includes a screw extrusion element 16 located in the lower portion of the kneader-extruder 12 which forces the mixture through an extrusion die 18 and onto the endless belt conveyor 20. Referring now to FIGS. 2 and 3, the extrusion die is shown to include a central cavity 22 in which the resin/filler mixture is forced. A plurality of linear extrusion ports 24 extend from the central cavity 22 to an extrusion face 26 at an angle of 30 degrees or less relative to the top surface of the conveyor belt. The angle is an acute angle of incidence relative to the top surface of the conveyor belt 28 generally in the same direction as the conveyor belt 28 moves. The die 18 includes an externally threaded portion 30 on one end for attaching the die 18 to the kneader-extruder 12, as is well known in the art. The extrusion face 26 is oriented at a 30 degrees or smaller angle relative to the front end of the die 18 which is perpendicular to the top surface of conveyor belt 28. The precise angulation of the extrusion die ports 24 is preferred to be maintained at 30 degrees or less to facilitate extruding the mixture on the conveyor belt 28 without breakage, stretching or compacting. The conveyor belt 28 is preferably made of or coated with a polytetrafluoroethylene or silicon coating to prevent adhesion of the mixture to the belt.

The mixture is deposited on the conveyor 28 in paste form, as shown in FIGS. 1 and 1a. The continuous strand 32 is highly filled with microspheres to provide cohesiveness in the strand after the strand is deposited on the conveyor. The high degree of filler loading prevents distortion when the strand is heated during the gelling step. The extruded paste is different from thermoplastic extrusions which are extruded in their melted state. In contrast to thermoplastic extrusions, the continuous strands made according to the present invention are not melted. A limited amount of heat may be developed during the kneading and extruding processes as a result of friction generated by the mixing.

With certain viscous resins having favorable heat distortion characteristics, it is necessary to warm the resin mixture to permit sufficient filler loading to form a cohesive extruded paste. Resins having good heat distortion characteristics generally have viscosity in excess of 700 cps. Extremely high viscosity resins having excellent heat resistance may be mixed with other compatible resins to reduce viscosity and aid in mixing with fillers. The viscosity of such resins prevents adding enough filler at ambient temperature to form an extruded strand which will retain its extruded cross-section after being deposited on the conveyor. Heating the resin mixture to between 125° to 140° F. lowers the viscosity of the resin to less than 700 cps and permits filler loading to between 20 and 35 percent of resin weight which gives the extruded strand sufficient cohesiveness after extrusion to be moved without distortion by the conveyor through the gelling step. Heating other types of resin above ambient but below B-stage may also permit increased filler loading. The extruded strand maintains its shape after being deposited in paste form on the conveyor belt because it is extensively loaded with lightweight fillers.

With resins having lower viscosity, additional heat is generally not necessary. Alternatively, the kneader-extruder 12 may include means for vibrating the die to reduce viscosity due to the thixotropic nature of the mixture and to aid in extrusion.

Figure 4:
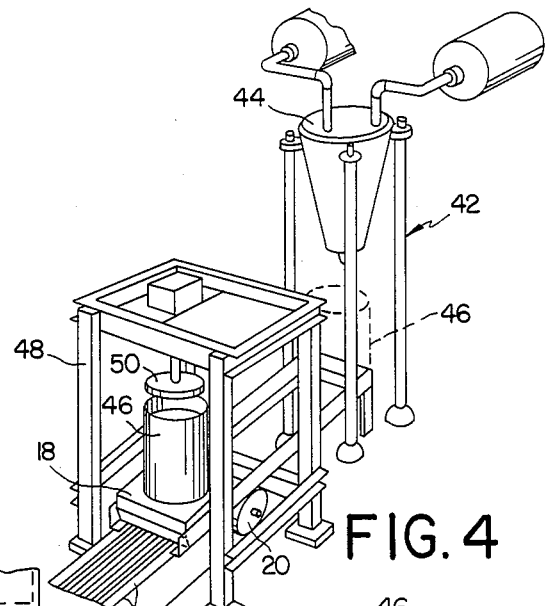
FIG. 4 is a perspective view of an illustrated embodiment of a bulk mixer and hydraulic press extruder for making the pellets used in the present invention.
Figure 6:
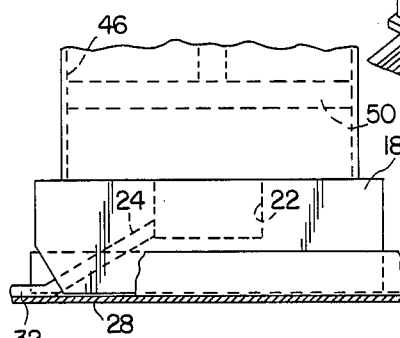
FIG. 6 is a fragmentary side elevational view of the hydraulic press extruder and die as shown in FIG. 4.
Figure 5:
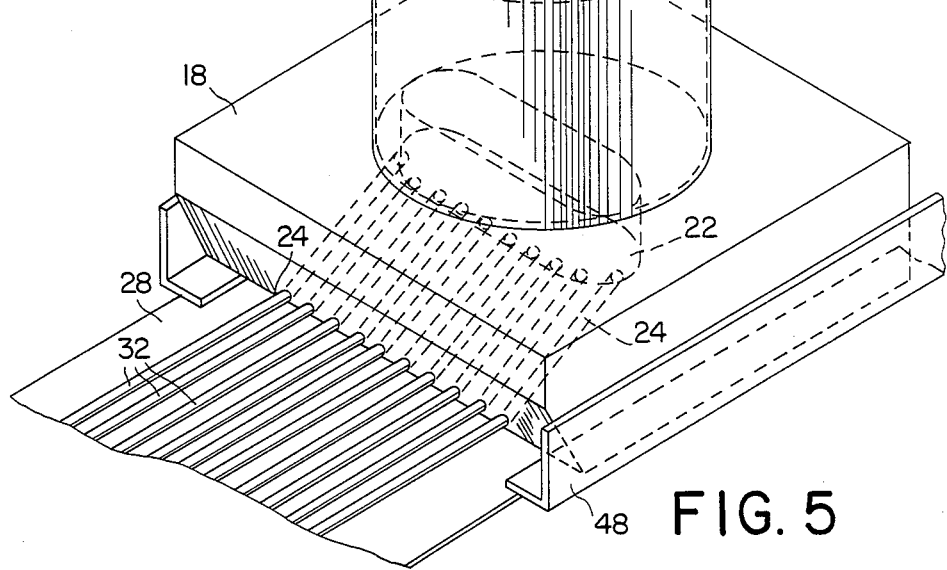
FIG. 5 is a perspective view of the drum and extrusion die used in the hydraulic press-type extruder and die as shown in FIG. 4.
Figure 7:
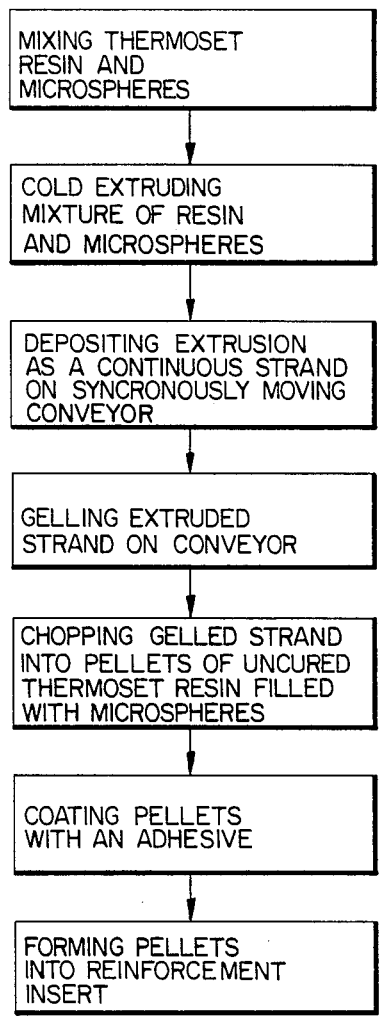
FIG. 7 is a block diagram illustrating the steps of the methods of the present invention.

Referring now to FIGS. 4 through 6, an alternate mixer and extruder apparatus will be described. Instead of a kneader-extruder 12, a batch mixer 42 comprising a feeder 44 loads the resin, fillers and other constituents into a mixing drum 46. The mixture in the mixing drum 46 may be manually or power mixed to form a homogeneous mixture. The drum 46 is then placed in a press 48 having a compression element 50 for exerting a compressive force on the mixture in the drum 46 to cause the mixture to be extruded through the extrusion die 18 located at the base of the central cavity 22 and a plurality of extrusion ports through which the mixture is forced onto the top surface of the conveyor belt 28 of the conveyor 20. The construction of the extrusion die 18 is substantially the same as the extrusion die of the kneader-extruder except that the central cavity is below the compression element 50 instead of being laterally adjacent the screw extrusion element 16. The orientation of the extrusion ports 24 relative to the conveyor is substantially the same for both apparatus.

The conveyor 28 preferably includes radiant heaters 34, or a catalyzing environment chamber, disposed adjacent the conveyor surface for accelerating the gelling process of the strands 32. It is possible to perform the process by allowing the strands to gel at room temperature without any expedient for gelling. However, for processing efficiency it is generally preferred to accelerate the gelling process by subjecting it to a catalyzing environment chamber 34 wherein the continuous strands are gelled and detackified. The catalyzing environment chamber is preferably a radiant heater 34 but may alternatively contain an ultraviolet radiation source, a microwave radiation source, radio waves or a chemical vapor. By using a catalyzing environment chamber, the time required to gel the strands may be reduced to as little as ten seconds or as long as three minutes but would preferably be a 60 to 90 second time period.

If the present mixture includes a blowing agent, or thermally expandable microspheres, the microspheres, or blowing agent, may be activated by the catalyzing environment chamber, or radiant heaters 34, causing the strands to expand during the gelling process. The primary reason for including unexpanded microspheres, or a blowing agent, is to reduce the density of the pellets. If expandable microspheres are included in the mixture, the quantity of expanded microspheres may be reduced accordingly.

The final step in the process is performed in a rotary chopping pelletizer 36 which chops the strands into generally cylindrical pellets 38. The pellets 38 are preferably one-eighth inch long cylinders which are one-eighth inch in diameter. The size of the pellets 38 is expected to vary from one-sixteenth to one-quarter of an inch in diameter and the pellets 38 are typically cut into cylindrical segments having the same length as they are in diameter. The strand must have more than 10% tensile elongation to be processed by a pelletizer. After pelletizing, the curing process continues until the pellets have about 6 to 8% tensile elongation.

After pelletizing, the pellets 38 are loaded into a post-cure mixer 40 and tumbled as they are coated with a B-staged epoxy resin or an epoxy resin dispersion in a solution. The epoxy resin is a heat curable resin preferably mixed with a cure agent. The coating may also be a polyester or vinylester. One epoxy resin that has produced good results is a Celanese resin having the trade designation CMD 35201. A coating made with CMD 35201 and a curing agent had approximately 2% maximum tensile elongation. Pellets coated with the CMD 35201 had good moisture resistance which protects the long-term strength characteristics of the pellets.

Instead of coating the pellets 38, immediately after pelletizing they may be stored for later processing.

After the pellets 38 have been coated, they may be stored or transferred to a pre-cast reinforcement forming operation as described in my copending patent application, Ser. No. 811,041, filed Dec. 19, 1985.

The pellets 38 in their simplest form are comprised of thermoset resin, resin cure agent, and pre-expanded microspheres with the microspheres being in the range of 20–35% resin weight. Currently, experimentation with thermoset polyester resins and inorganic pre-expanded microspheres has resulted in the production of pellets wherein the microspheres may be added in the amount of three and one-half times the resin volume. Further addition of microspheres results in excessive viscosity of the mixture and difficulty in extrusion which could be alleviated by adding a lubricating additive or heating.

The bulk density of pellets made with only pre-expanded microspheres may be as low as 12 pounds per cubic foot. If additional weight reduction is desired, the pellets may include thermally expandable microspheres in addition to the pre-expanded microspheres wherein the bulk density of the pellets may be reduced to as low as 9 pounds per cubic foot.

Other additives such as cure agents, wetting agents or diluents may be added to the mixture to accelerate the curing of the resin or lubricate the resin keeping it flowable for processing by the kneader-extruder.

The following table sets forth the constituents, trade names, generic composition and preferred and broad ranges of constituents.

TABLE II

| Generic Constituent | Type | Tradenames* | Broad Range as % Resin Wgt. | Preferred Range % Resin Wgt. |
|---|---|---|---|---|
| Thermoset Resin | a. Polyester | Altek Polyester Molding Resin USS Chem./LB804-31 USS Chem./MR13031 | 100% | 100% |
|  | b. Vinylester | USS Chem./MR 14059 | 100% | 100% |
|  | c. Epoxy | Celanese/Epi-Rez SU 2.5/507 Celanese/CMD35201 Shell/EPON 828/1031 Celanese/Epi-rez 504 | 100% | 100% |
| Mircrosphere Filler | a. Organic | Phila. Quartz/Q-Cell 200 PA Industries/Extendospheres | 25–35% | 25–35% |
|  | b. Glass Bubbles | 3M Company/C 15 | 20–30% | 20–25% |
|  |  | Grefco/Dicaperl HP (10–30 u) | 25–35% | 25–35% |
|  | c. Thermoplastic | Pierce & Stevens/ Miralite 177 | 0–5% | 3–5% |
| Curing Agent | a. Organic Peroxide | Tert Butyl Peroxy Diethylacetate Noury/Percadox 16 | 1–3% | 2–3% |
|  | b. Dicyandiamide | Celanese/DiCy | 3–10% | 8–10% |

TABLE II-continued

| Generic Constituent | Type | Tradenames* | Broad Range as % Resin Wgt. | Preferred Range % Resin Wgt. |
|---|---|---|---|---|
| | c. Aliphatic Amine | Epicure/826 | 25% | 25% |
| | | Shell/Epon 871 | 25% | 25% |
| | | Epicure/855 | 50% | 50% |
| | d. Anahydride | Buffalo Color Corp./ NADIC Methyl Anahydride | 80–90% | 80–85% |
| Expansion Agent | a. Expandable Microspheres | Pierce & Stevens/ Microlite 126/206 | a. 3–10% | a. 6–8% |
| | b. Blowing Agent | Uniroyal/Celogen TSH | b. .25–3% | b. 2–3% |
| Accelerators | Tertiary Amines | Benzyldimethylaine (2,4,6 tri dimethyl-aminoethyl phenol) (dimethylaminomethyl phenol) 2 ethyl-4 methyl imidazole (EMI-24) | 0–8% | 4–6% |
| Wetting Agent or Diluent | a. Surfactant | Butyl Glycidyl Ether Cresyl Glycidyl Ether Neopentyl Glycol | a. 0–25% | 6–15% |
| | b. Polymer | Styrene | b. 0–15% | 5–13% |
| | c. Solvent | Water Ether Ester | c. 0–15% | 5–10% |
| Plasticizers | Polymer | C.P. Hall/Paraplex G-30 | 0–15% | 5–10% |

*The tradenames are listed by company name/trade designation as appropriate.

If desired, pellets may be made according to the invention from only thermoset resin, microsphere filler and curing agent.

Examples of resin mixtures are given below:

EXAMPLE I

Celanese Epi-Rex 504 (Bisphenol A)

| % Resin Weight | |
|---|---|
| 50% | Cel Epicure 855 |
| 23% | 3M C-15 |
| 2 min strand gel at 165° F. | |

EXAMPLE II

Alkyl Polyester Molding Resin

| % Resin Weight | |
|---|---|
| 22% | 3M C15 bubbles |
| 1% | Noury Percadox 16 (bis peroxydicarbonate) |
| 60 sec strand gel at 200° F. | |

EXAMPLE III

U.S.A. Chemical LB 804-31 (Polyester)

| % Resin Weight | |
|---|---|
| 25% | 3M-C15 |
| 0.25% | MEK Peroxide |
| 60 sec strand gel at 165° F. | |

EXAMPLE IV

Altek Polyester Molding Resin

| % Resin Weight | |
|---|---|
| 5% | Miralite 177 |
| 1% | Noury Percadox 16 (bis peroxydicarbonate) |
| 60 sec strand gel at 190° F. | |

EXAMPLE V

U.S.S. Chemical LB 804-31 (Polyester)

| % Resin Weight | |
|---|---|
| 24% | 3M C15 bubbles |
| 5% | Microlite 206 |
| 2% | Tert Butyl Peroxy (Noury) |
| 60 sec strand expansion and then gel at 250° F. | |

EXAMPLE VI

Celanese epoxy Epi-Rez 5071 (Bisphenol A)

| % Resin Weight | |
|---|---|
| 25% | Celanese Epi-Cure 826 |
| 30% | Q-Cell 200 |
| 90 sec strand gel at 190° F. | |

EXAMPLE VII

U.S.S. Chemical LB804-31 (Polyester)

| % Resin Weight | |
|---|---|
| 15% | Dicaperl HP (10–30 microns) |
| 3% | Miralite 177 |
| 2% | Noury Percadox 16 |
| 90 sec strand gel at 175° F. | |

EXAMPLE VIII

U.S.S. Chemical MR 13031 (Polyester)

| % Resin Weight | |
|---|---|
| 25% | 3M C15 |
| 2% | Celogen TSH |

-continued

| % Resin Weight | |
|---|---|
| 2% | Tert Butyl Peroxy (Noury) |

60 sec strand expansion and then gel at 250° F.

EXAMPLE IX

Shell Epon 828 (Bisphenol A)

| % Resin Weight | |
|---|---|
| 100% | Shell Epon 1031 |
| 20% | Shell Epon 871 |
| 110% | 3M C15 |
| 80% | Nadic Methyl Anhydride |
| 4% | 2 ethyl-4 methyl-imadazole |

90 sec strand gel time at 195° F.

EXAMPLE X

Celanese SU-2.5 (polyfunctional)

| % Resin Weight | |
|---|---|
| 25% | Celanese Epi-Rez 507 |
| 70% | Dicaperl HP (10–30 microns) |
| 100% | Nadic Methyl Anhydride |
| 6% | 2 ethyl-4 methyl-imadazole |

90 sec strand gel time at 195° F.

EXAMPLES XI

U.S.S. Chemical 14059 (Vinylester)

| % Resin Weight | |
|---|---|
| 25% | 3M C15 |
| 2% | Celogen TSH |
| 2% | Tert Butyl Peroxy (Noury) |

If the process includes coating the pellets with an epoxy resin in the post-cure mixer, an aqueous epoxy resin dispersion can be used which includes from 0.25 to 1 percent resin weight of an accelerator such as Pyridine (DMP 30) or 2-ethyl 4-methyl imidazole (EMI 24) and from 2 to 4 percent by resin weight of a catalyst, preferably dicyandiamide.

The ultimate strength and average crush load of blocks of pellets made according to the formulas of Examples I through III above have been tested against reinforcement blocks made of the prior art macrobubbles sold by 3M under the trade designation M35EX. As noted above, one of the most important characteristics of a reinforcement is its strength, which may be measured in terms of ultimate strength and average crush load.

Blocks of pellets made in accordance with Examples I through III above and microbubbles were formed into separate cylindrical blocks having a diameter of three inches and a height of three inches. The blocks were formed of pellets coated with a two-part ambient-cured epoxy material and cast in a cylindrical mold. Each of the blocks was placed in a compression test machine having a machine speed of 0.5 inches per minute. The compression test machine has a maximum compression of 20,000 pounds with the result being recorded in pounds compression over time on a chart recorder. The test results recorded included recording of crush load to 17–20% of the total height of the block.

The prior art control sample exhibited ultimate crush strength of 4,000 pounds and an average crush load of approximately 3,000 pounds.

Two different batches of pellets made in accordance with Example I were tested and both yielded considerably higher average crush load. The ultimate strength of the two batches differed with one batch having an ultimate strength of 6,400 pounds and a second batch having an ultimate strength of 4,200 pounds. The batch having the greater ultimate strength also had considerably better average crush load. The reason for the disparity between the two batches is that the batch having the lower ultimate strength and average crush load was made with resin that was more than one year old at the time it was formed into pellets.

Pellets made in accordance with Example II were formed into blocks and tested, yielding an ultimate strength measurement of 6,700 pounds. The average crush load of the block was slightly lower than the average crush load for the prior art block and the load over time decreased until it stabilized at approximately 2,000 pounds.

The block made with pellets made according to Example III had an ultimate strength measurement of 4,000 pounds and a lower average crush load than the control. The crush load characteristic was similar to that followed by the block made with pellets of Example II.

In summary, the test results obtained with pellets made in accordance with Example I were markedly superior to those realized by the prior art in terms of both ultimate strength and average crush load. The ultimate strength was more than 50% greater than the control for pellets made in accordance with Examples I and II. The average crush load for pellets made according to Example I in both batches was substantially superior to that of the test block made with the prior art 3M macrosphere material. The ability to control the ultimate strength and average crush load characteristics of reinforcements made with the pellets of the present invention presents the possibility of engineering reinforcements to meet strength, weight and cost constraints depending upon the requirements of the particular reinforcement.

Generally, the most important performance criteria for a plastic reinforcement element is that it have the required ultimate strength and average crush load bearing capability. Another very important characteristic of a plastic reinforcement is the mass of the reinforcement, especially in view of the current efforts to reduce weight in vehicles.

The ultimate strength of a reinforcement is vital to its impact resistance. In addition to ultimate strength, the average crush load is indicative of the load required to crush the reinforcement to a degree of time dependent deflection. The average crush load is important in analyzing the ability of the knee blocker to withstand sheer and bending loads. For desirable ultimate strength, it has been found that a low percent tensile elongation, such as 2%, provides relatively high ultimate strength characteristics. Conversely, higher percent tensile elongation characteristics, such as 6 to 7% tensile elongation, generally provide superior average crush load characteristics.

Desirable strength characteristics of plastic reinforcements may be diminished over time, especially if exposed to moisture. Generally, the greater the percent tensile elongation of a given resin, the less resistant it is to moisture.

One final desirable characteristic of a plastic knee blocker is its cost relative to other passive restraint systems that offer comparable protection.

One problem with heat-resistant thermoset resins is that they tend to be too viscous to mix with microspheres at ambient temperature. It has been found that the viscosity of a resin prior to adding the filler materials should be less than 700 centipoises. Therefore, to permit the use of viscous heat-resistant resins, it is necessary to warm the resin to a temperature above ambient temperature but below the B-stage temperature of the resin. As the resin is heated, its viscosity is reduced, and the microsphere fillers may be intermixed therewith.

In a preferred embodiment of the present invention, a pellet having a percent tensile elongation of 6 to 8% would be provided to improve average crush load characteristics of the pellet. The pellet would then be coated with a low percent tensile elongation epoxy resin, having approximately 2% tensile elongation, to improve the ultimate strength of the reinforcement and provide good moisture resistance, thereby assuring retention of desirable strength characteristics. If the reinforcement is intended to be used in a high temperature environment, the resin selected for both the pellet and coating should be of a heat-resistant type. In this way, a tough, lightweight, high strength, heat and moisture-resistant reinforcement, having significant cost advantages, would be provided.

COATING EXAMPLE

| % Resin Weight | COATING EXAMPLE |
|---|---|
| 100% | Celanese CMD 35201 |
| 3.5% | DiCyanamid |
| 1% | 2-ethyl-4-methyl-imadazole |

If an expandable resin coating is desired to provide an expansion of the adhesive resin coating in the final cure step, the resin coating may include from 2 to 3 percent by resin weight of a blowing agent such as Celogen TSH, a trademark of Uniroyal, or it may include from 6 to 10 percent by resin weight of unexpanded thermoplastic microspheres such as Microlite 126/206, a trademark of Pierce and Stevens Company. The coating may be applied to the pellets at the rate of approximately 20 to 35 percent of the total pellet weight.

A coupling agent may be used in the resin or on the microbubbles to enhance the properties of the reinforcement incorporating the pellets by increasing the tensile elongation and compressive strength. The coupling agent may be either a silane or non-silane coupling agent.

Figure 8:
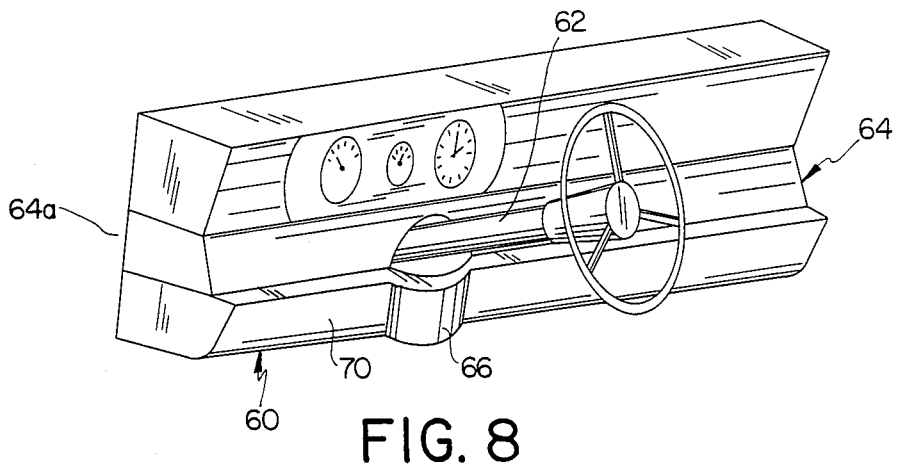
FIG. 8 is a front perspective view of a preferred embodiment of the knee blocker for an automotive application of this invention.
Figure 9:
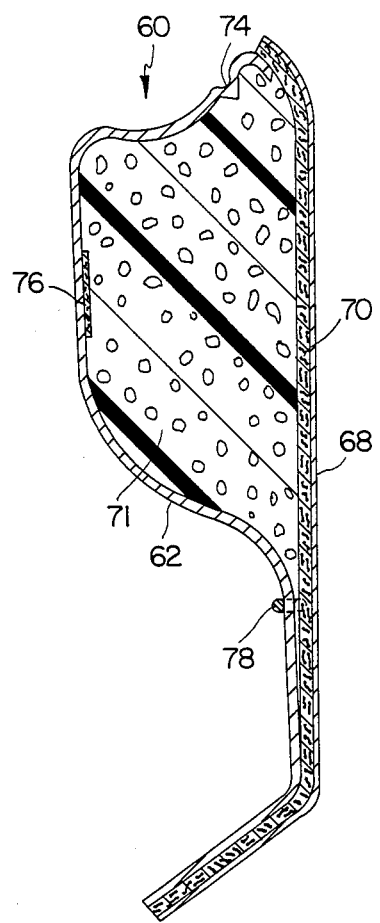
FIG. 9 is a side cross-sectional view of the knee blocker of this invention.
Figure 10:
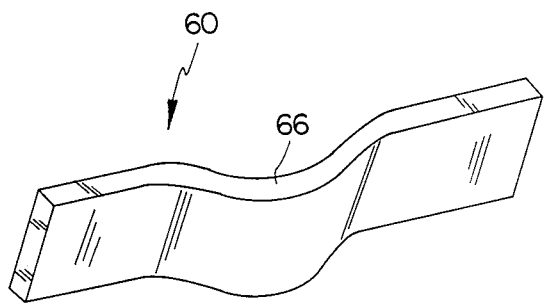
FIG. 10 is a front perspective view of the knee blocker of this invention.

As shown in FIG. 8, pellets as aforedescribed are incorporated into a knee blocker 60 that is under the steering column 62 forward of the knees of an individual. As shown in FIG. 9, the construction of this knee blocker 60 basically consists of a one piece metal stamping 62 which is approximately 12 inches high and runs the full width of the car from hinge pillar 64a to hinge pillar 64b and has a local pocket 66 around steering column 62 in front of the driver which receives the knee blocker. The other side of the lower instrument panel consists of a one-quarter inch thick urethane foam padding 68 with a vinyl skin 70 attached thereto. The knee blocker is actually sandwiched between the metal stamping 64 and the foam vinyl skin 70 in a female pocket 71.

This pre-cast element is made by vacuum forming a female pocket and once this vacuum formed pocket is formed, casting the pre-coated pellets into the female pocket. The whole assembly is held then in a female tool heated to 220° F. until the core is cured. The core will cure completely within approximately ten minutes using a water-based epoxy adhesive.

These pellets incorporated in the female pocket will act as a crushable medium in that when the knee impacts the lower instrument panel, energy is absorbed by the pulverization or crush of the medium. Such a system also provides for multi-directional energy absorption, and as such the knees may impinge upon the knee blocker at any orientation.

Furthermore, this pre-cast element can be attached to the metal panel for initial product assurance by means of a variety of methods. For example, the pre-cast part can be locked or trapped into the sheet metal at the top by a notch 74 in the sheet metal. It can also be bonded to the metal panel by means of a butyl tape 76 of adhesive. As a third means of attachment, the vacuum foam sheet can be stapled to the metal, such as 78. Other blockers or bolsters will have variations in the mechanical attachment, adhesive, or method of entrapment. For instance, fasteners could also be imbedded into the core to provide attachment. In addition, a hole could be drilled through the core and a christmas tree or plastic fastener could be plunged through the core and into the metal panel.

If dry coated pellets are to be supplied to the instrument panel fabricator, the vacuum formed piece, the adhesive, and the staple would be eliminated. For this application, a metal, cardboard or plastic part would have to be provided to act as a closure wall to contain the pellets.

The sequence of manufacturing such a knee blocker is that the large metal stamping is produced first, the closure pieces fabricated and assembled to the main stamping, and the pellets are then poured or pumped in loose into the cavity. The filled assembly is heated until the pellets cure. The multiple-fold advantage of the vacuum formed skin is that it acts as a forming tray. Since there will be 16 parts in the tool at one time, a package tray of the knee bolsters will be manufactured similar to a package tray for christmas ornaments. Once the tray comes off the tool, it will be dye cut for approximately 80% of the perimeter around the bolster part. This tray of 16 parts will be shipped as a module in a carton. This vacuum formed skin helps improve the core performance by encapsulating the core on three sides. The vacuum formed material could be ABS, polystyrene, acetate, butyldiene, or other similar vacuum form materials. The thickness of the vacuum form is preferably between 0.020 to 0.125 inches. This dimension is important for a number of reasons. These include product performance, handling of the pre-cast part, and acting as a mold or tool in the casting process.

In another preferred embodiment of the knee bolster blocker of this invention, the pellets may be poured into position in the metal stamping. If this is done, the adhesive bead is not necessary. The vacuum formed skin would be removed and there would be a closure piece separating the formed vinyl from the pellet core. The closure piece could be a polystyrene skin, metal stamping, welded in, or even stapled cardboard.

As aforedescribed, this knee blocker is engineered as a crushable system where the amount of crush and force to crush is controlled. The utilization of the pellets as described being inserted into the female cavity of the knee bolster reduces the femur loads due to frontal impact at 30 mph. This knee blocker can be tailored in thickness over the length of the part to control the amount of energy absorption required. Of course, this passive restraint could be applied to other areas of the automobile, such as the doors and/or dashboards and would provide significant energy absorption capabilities.

It will be appreciated that the above examples and description of the preferred apparatus, process and compositions are intended as exemplary and not in a limiting sense. It will be appreciated that within the scope of the appended claims many variations, modifications and changes may be made within the spirit and scope within the present invention.

What is claimed is:

1. A passive restraint system for a vehicle comprising an energy absorbing core enveloped by a frame, said core being filled with a plurality of pellets, each said pellet consisting essentially of substantially uncured thermoset polymeric resin and microspheres which have been intermixed and extruded, each said pellet also having a coating of a B-staged resin.

2. A passive restraint system for a vehicle comprising:
   a frame being secured to the vehicle and having a plurality of outer surfaces;
   a metal stamping layer disposed on one outer surface of said frame;
   a vinyl foam skin padding being disposed on another outer surface of said frame;
   an energy absorbing core being disposed between said metal stamping and said vinyl foam skin padding; said core being filled with a plurality of pellets, each said pellet consisting essentially of substantially uncured thermoset polymeric resin and microspheres which have been intermixed and extruded, each said pellet also having a coating of a B-staged resin.

3. The passive restraint of claim 2 and further including a layer of urethane foam being disposed between said vinyl foam skin padding and said energy absorbing core to provide increased energy absorption.

4. A method of making passive restraint for a vehicle comprising filling a plurality of pellets into an energy absorbing core enveloped by a frame with each said pellet consisting essentially of substantially uncured thermoset polymeric resin and microspheres which have been intermixed and extruded and each pellet having a coating of a B-staged resin.

5. A method of making a passive restraint system for a vehicle comprising:
   securing a frame having a plurality of outer surfaces to the vehicle;
   applying a metal stamping layer to one outer surface of said frame;
   applying a vinyl skin padding layer to another outer surface of said frame forming an energy absorbing core between said metal stamping and said vinyl skin padding layer; and
   filing said core with a plurality of pellets with each said pellet consisting essentially of substantially uncured thermoset polymeric resin and microspheres and having a coating of a B-staged resin.

6. The method of making a passive restraint of claim 5 and further including applying a layer of urethane foam between said vinyl foam skin padding layer and said energy absorbing core to provide increased energy absorption.

7. A method of making a passive restraint system for a vehicle comprising:
   mixing thermoset resins and microspheres to form a homogeneous mixture;
   extruding said mixture to form at least one continuous strand;
   depositing said strand on an endless belt conveyor moving at a speed substantially equal to the rate said strand is extruded;
   expanding and gelling said moving strand on said moving conveyor by exposing said strand to heating means positioned adjacent said moving conveyor to form a solid strand having a percent tensile elongation of more than 10% which is less than B-staged;
   forming said strand into further curable pellets of thermoset resins filled with microspheres by chopping said gelled strand with chopping means to form said further curable pellets; and
   filling a plurality of said pellets into an internal cavity enveloped by a frame secured to the vehicle.

* * * * *